(12) United States Patent
Dominguez Cuevas et al.

(10) Patent No.: US 11,155,042 B2
(45) Date of Patent: Oct. 26, 2021

(54) HYBRID ULTRASONIC STAKING FOR JOINING PANELS

(71) Applicant: GM Global Technology Operations LLC, Detroit, MI (US)

(72) Inventors: Jesus Edgar Dominguez Cuevas, Jiutepec (MX); Alejandro Barrera Torres, Metepec (MX); Fernando Nava Ortiz, Atizapan de Zaragoza (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 254 days.

(21) Appl. No.: 16/180,404

(22) Filed: Nov. 5, 2018

(65) Prior Publication Data

US 2020/0139636 A1 May 7, 2020

(51) Int. Cl.
| | | |
|---|---|---|
| *B32B 37/00* | (2006.01) | |
| *B29C 65/08* | (2006.01) | |
| *B29C 65/60* | (2006.01) | |
| *B29C 65/00* | (2006.01) | |
| *B29K 55/02* | (2006.01) | |
| *B29L 31/30* | (2006.01) | |

(52) U.S. Cl.
CPC ............ *B29C 65/08* (2013.01); *B29C 65/606* (2013.01); *B29C 66/00145* (2013.01); *B29C 66/8322* (2013.01); *B29K 2055/02* (2013.01); *B29L 2031/3041* (2013.01)

(58) Field of Classification Search
USPC ...................................................... 156/580.1
See application file for complete search history.

(56) References Cited

U.S. PATENT DOCUMENTS

| 4,426,244 | A | * | 1/1984 | Wang | ................ | D04H 1/555 |
|---|---|---|---|---|---|---|
| | | | | | | 156/498 |
| 2006/0200967 | A1 | | 9/2006 | Adams et al. | | |
| 2007/0040281 | A1 | * | 2/2007 | Nakayama | ............ | B81B 7/0041 |
| | | | | | | 257/778 |
| 2011/0186204 | A1 | * | 8/2011 | Cai | .................... | H01M 50/502 |
| | | | | | | 156/73.1 |

FOREIGN PATENT DOCUMENTS

| CN | 1643652 | A | 7/2005 |
|---|---|---|---|
| CN | 1751869 | A | 3/2006 |
| CN | 102189327 | A | 9/2011 |
| CN | 203854202 | U | 10/2014 |
| CN | 107000326 | A | 7/2018 |
| CN | 108340590 | A | 7/2018 |
| DE | 102015009373 | A1 | 1/2017 |
| EP | 0342729 | A1 | 11/1989 |
| EP | 1757556 | A2 | 2/2007 |
| EP | 3135457 | A1 | 3/2017 |
| JP | 2015124804 | A | 7/2015 |
| WO | 2007109855 | A1 | 10/2007 |
| WO | 2018011446 | A1 | 1/2018 |

* cited by examiner

*Primary Examiner* — James D Sells

(57) ABSTRACT

An apparatus to join two panels together includes a chamber, a horn positioned within the chamber, the horn moving reciprocally within the chamber, and a set of heating elements positioned about the horn to heat the horn. One of the panels has a post molded to it, the post extending through the other panel, and after the horn is heated an end of the horn is placed on top of the post and is ultrasonically vibrated to form a head of the post to join the two panels together.

20 Claims, 4 Drawing Sheets

HYBRID ULTRASONIC STAKING FOR JOINING PANELS

INTRODUCTION

The present disclosure relates to an apparatus to join two panels together. More specifically, the present disclosure relates to an apparatus to join two panels together with ultrasonic staking.

In a typical motor vehicle, the motor vehicle includes components such as a doors with interior and exterior subcomponents. In certain arrangements, the components are clamped together with polymer posts utilizing ultrasonic staking. While current processes to joins panels together achieve their intended purpose, there is a need for a new and improved apparatus and method for joining together panels in various motor vehicle components.

SUMMARY

According to several aspects, an apparatus to join two panels together includes a chamber, a horn positioned within the chamber, the horn moving reciprocally within the chamber, and a set of heating elements positioned about the horn to heat the horn. One of the panels has a post molded to it, the post extending through the other panel, and after the horn is heated an end of the horn is placed on top of the post and is ultrasonically vibrated to form a head of the post to join the two panels together.

In an additional aspect of the present disclosure, the post is made of a material, a portion of the material flowing into the interior of the post to provide increased pull strength of the post.

In another aspect of the present disclosure, a vacuum is drawn in the chamber prior to and during the ultrasonic vibration of the horn.

In another aspect of the present disclosure, the vacuum draw is stopped.

In another aspect of the present disclosure, the vacuum draw removes oxygen to avoid thermal oxidation of the material.

In another aspect of the present disclosure, the horn applies a force to the head of the post after the ultrasonic vibration ceases.

In another aspect of the present disclosure, a flow of cooling air is applied to the horn as the horn applies a force to the head of the post, the cooling temperature having a temperature less than an interior temperature of the chamber.

In another aspect of the present disclosure, the flow of cooling air ceases and the horn moves up away from the head of the post.

In another aspect of the present disclosure, the post is made of a polymer and the cooling of the polymer increases the crystallinity of the polymer.

According to several aspects, an apparatus to join two panels together includes a chamber, a horn positioned within the chamber, the horn moving reciprocally within the chamber, and a set of heating elements positioned about the horn to heat the horn. One of the panels has a post molded to it, the post extending through the other panel, the post being made of a material, a portion of the material flowing into the interior of the post to provide increased pull strength of the post. After the horn is heated an end of the horn is placed on top of the post and is ultrasonically vibrated to form a head of the post to join the two panels together, and a vacuum is drawn in the chamber prior to and during the ultrasonic vibration of the horn.

In another aspect of the present disclosure, the vacuum draw ceases.

In another aspect of the present disclosure, the horn applies a force to the head of the post after the ultrasonic vibration ceases.

In another aspect of the present disclosure, a flow of cooling air is applied to the horn as the horn applies a force to the head of the post, the cooling air having a temperature less than an interior temperature of the chamber.

In another aspect of the present disclosure, the flow of cooling air ceases and the horn moves up away from the head of the post.

According to several aspects, a method of joining two panels together includes one or more of the following: staking the panels, one of the panels having a spacer with post molded to it and extending through the other panel, the post being made of a material, a portion of the material flowing into the interior of the post to provide increased pull strength of the post; clamping the panels together; heating a horn positioned in a chamber; placing the end of the horn on top of the post; and ultrasonically vibrating the horn to form a head of the post.

In another aspect of the present disclosure, the method further including drawing a vacuum in the chamber prior to and during the ultrasonic vibration of the horn.

In another aspect of the present disclosure, the method further including stopping the drawing of the vacuum.

In another aspect of the present disclosure, the method further including applying a force with the end of the horn to the head at the head of the post after the ultrasonic vibration ceases.

In another aspect of the present disclosure, the method further including applying a flow of cooling air to the horn as the horn applies a force to the head of the post, the cooling air having a temperature less than an interior temperature of the chamber.

In another aspect of the present disclosure, the method further including ceasing the flow of cooling air and moving the horn up away from the head of the post.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
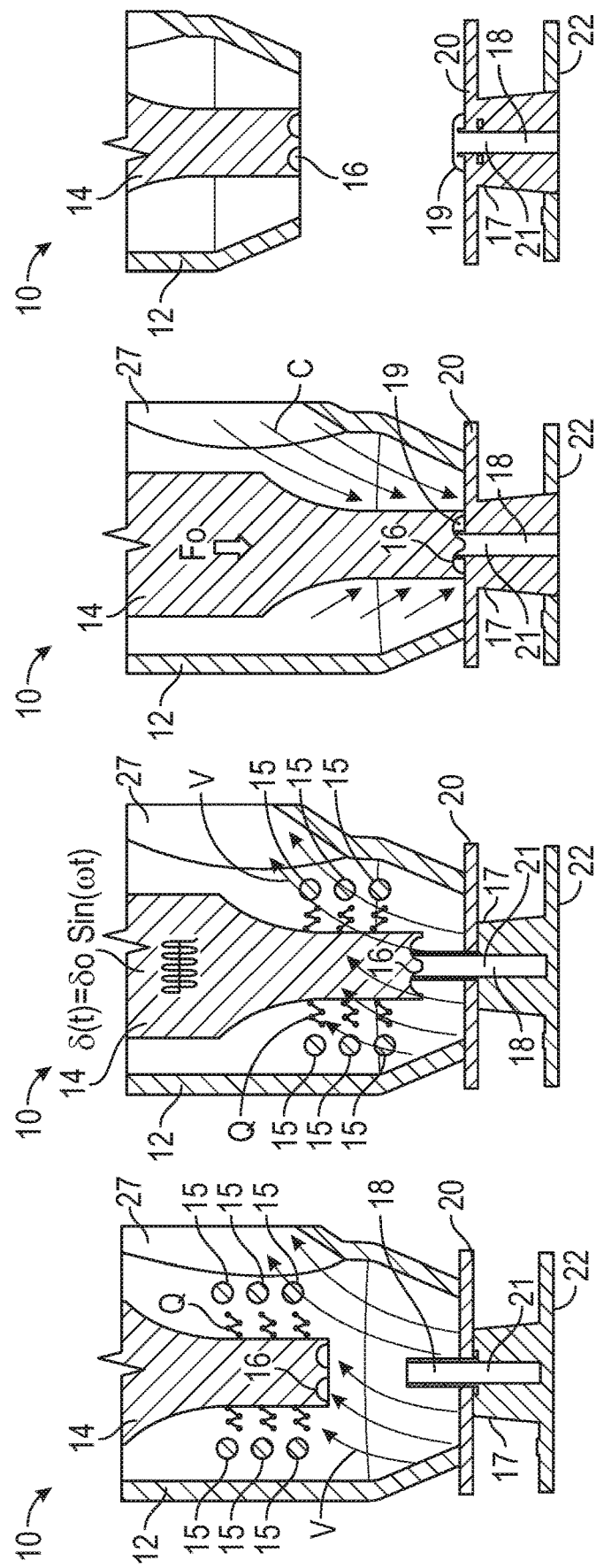
FIGS. 1A-1D illustrate an apparatus to join two panels together according to an exemplary embodiment.

The following description is merely exemplary in nature and is not intended to limit the present disclosure, application, or uses.

Referring to FIGS. 1A through 1D, there is shown an apparatus 10 that utilizes a hybrid ultrasonic staking process to join two panels 20 and 22 together. The apparatus 10 includes a chamber 12 and a sonotrode such as a horn 14 positioned in the chamber 12. A set of heating elements 15 are positioned in the chamber 12 about the horn 14. At the end of the horn 14 is a cavity 16. The shape of the cavity 16 can be any suitable shape with any suitable cross section. For example, in some arrangements the cavity 16 is a circular ring with a hemispherical cross section. In other arrangements, the cavity 16 has a rosette shape, and yet in certain arrangements the cavity 16 has a dome shape.

Figure 2:
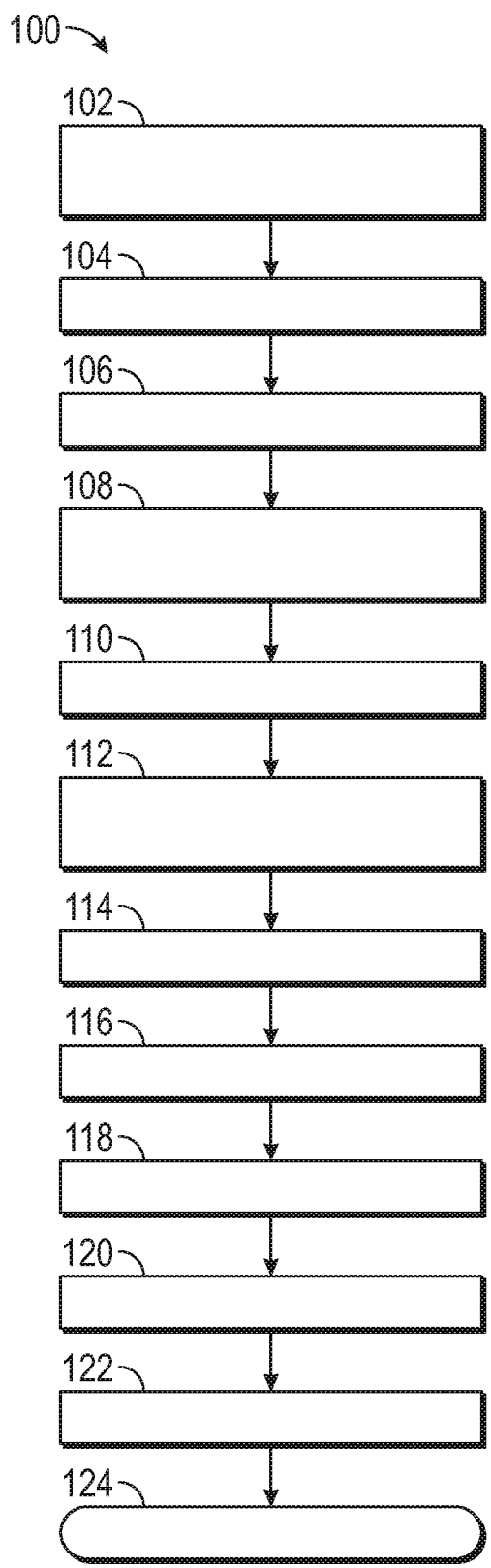
FIG. 2 is a flow diagram of utilizing the apparatus.

Referring further to FIG. 2 along with FIGS. 1A through 1D, there is shown a process 100 that implements the apparatus 10 to join the two panels 20 and 22 together. In step 102 the panels are staked in a nest. A spacer 17 with a stake or post 18 are initially molded to the panel 22 with the post 18 extending through the panel 20. In step 104 the panels 20 and 22 are clamped together against the nest. The post 18 is made of a polymer and shaped as a tube with interior region 21.

The process 100 then moves to step 106 where the heating elements 15 are activated to heat the horn 14 with a heat flow Q as well as the post 18. In step 108 a vacuum V is drawn to remove air from the chamber 12. In step 110 the horn 14 moves downward so that the end of the horn 14 engages with the post 18. A force Fo is applied to the post 18 with the horn 14. The horn 14 is ultrasonically vibrated (FIG. 1B) with a waveform δ(t) where w is the frequency and t is time. The horn 14 continually vibrates until a head 19 is formed at the top of the post 18. The vibration of the horn 14 then ceases in step 112 and the vacuum ceases in step 114. In various arrangements, the vacuum ceases at any desired time during the process 100. For example, in particular arrangements, the vacuum ceases before the application of the Fo and the ultrasonic vibration, while in other arrangements, the vacuum ceases after the application of the ultrasonic vibration and force Fo. Regardless when the vacuum ceases, the vacuum withdraws oxygen from the chamber 12 to avoid degradation (that is, thermal oxidation) of the polymer from which the post 18 is made. In some arrangements, a gas such as, for example, nitrogen or argon, are injected into the chamber 12 to displace the oxygen in the chamber 12 to prevent degradation of the polymer.

In step 116 the welding force Fo is maintained while cooling air flow C from an opening 27 in the chamber 12 is applied to the horn 14 and the head 19 of the post 18 (FIG. 1C) in step 118. The temperature of the cooling air C is less than the interior temperature of the chamber 12. The temperature of the cooling air C is selected to cool the polymer at a controlled rate to ensure a desired degree of crystallinity of the polymer. The force Fo is constant in certain arrangements, while in other arrangements the force varies. For example, in particular arrangements, the force Fo is increased or reduced at a desired rate. In step 120 the cooling air flow ceases and the horn 14 is moved upwards and away from the head 19 of the post 18 in step 122. The process 100 end in step 124.

In a particular arrangement, the post 18 is made of an amorphous type polymer (ABS), while in other arrangements the post 18 is made of a semi-crystalline polymer (TPO). In certain arrangements, the vacuum V applied is between about $0.5 \times 10^5$ to $3 \times 10^3$ Pascals to remove oxygen from contacting the polymer post 18 to avoid possible chain scission, that is, oxidation of the polymer. In various arrangements, the post 18 was heated, Q, to a temperature between about 45° C. and 210° C. and cooling air flow was between about 20 ft$^3$/hour and 70 ft$^3$/hour. In particular arrangements, the welding force is between about 50 to 450 N.

Figure 3:
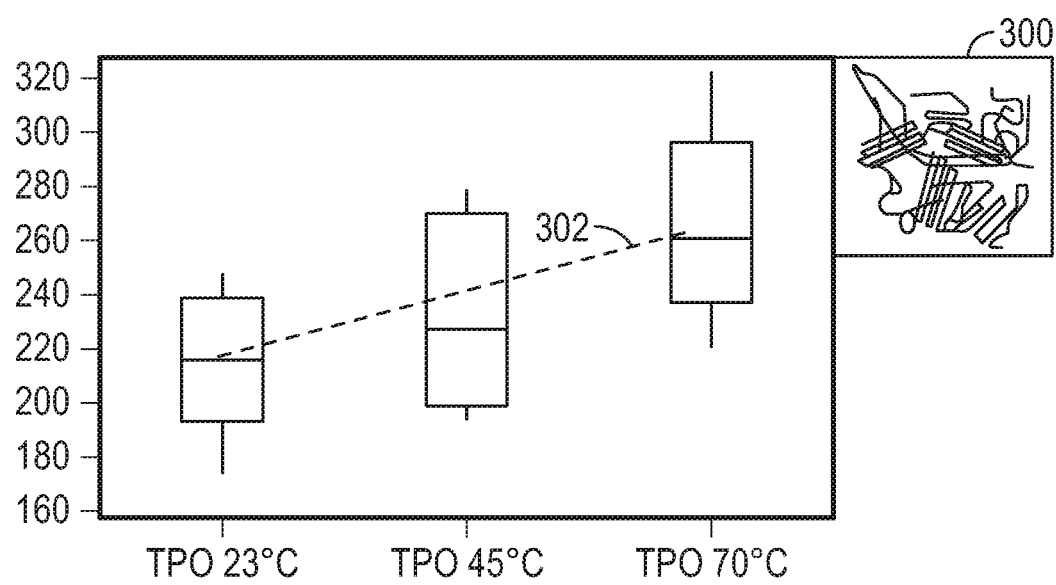
FIG. 3 shows the improvement in tensile strength of a post joining two panels together.

Referring now to FIG. 3, there is shown the tensile strength of a post 18 made of a semi-crystalline polymer (TPO) illustrated as 300 when heated for various temperatures during the process 100. Note that in various arrangements, while the temperature of the horn 14 is maintained at a specified temperature, the polymer is initially heated and then cooled to ensure desired degree of crystallinity of the polymer. Specifically, FIG. 3 illustrates an improvement in the tensile strength of the post 18 as the post 18 is heated by the horn 14. Accordingly, FIG. 3 clearly shows that increased heating of the post 18 increases the tensile strength of the post 18 to improve the clamping strength between the panels 20 and 22. The cooling of the post 18 in step 118 further enhances the post 18 to retain and set the tensile strength of the post 18.

Figure 4:
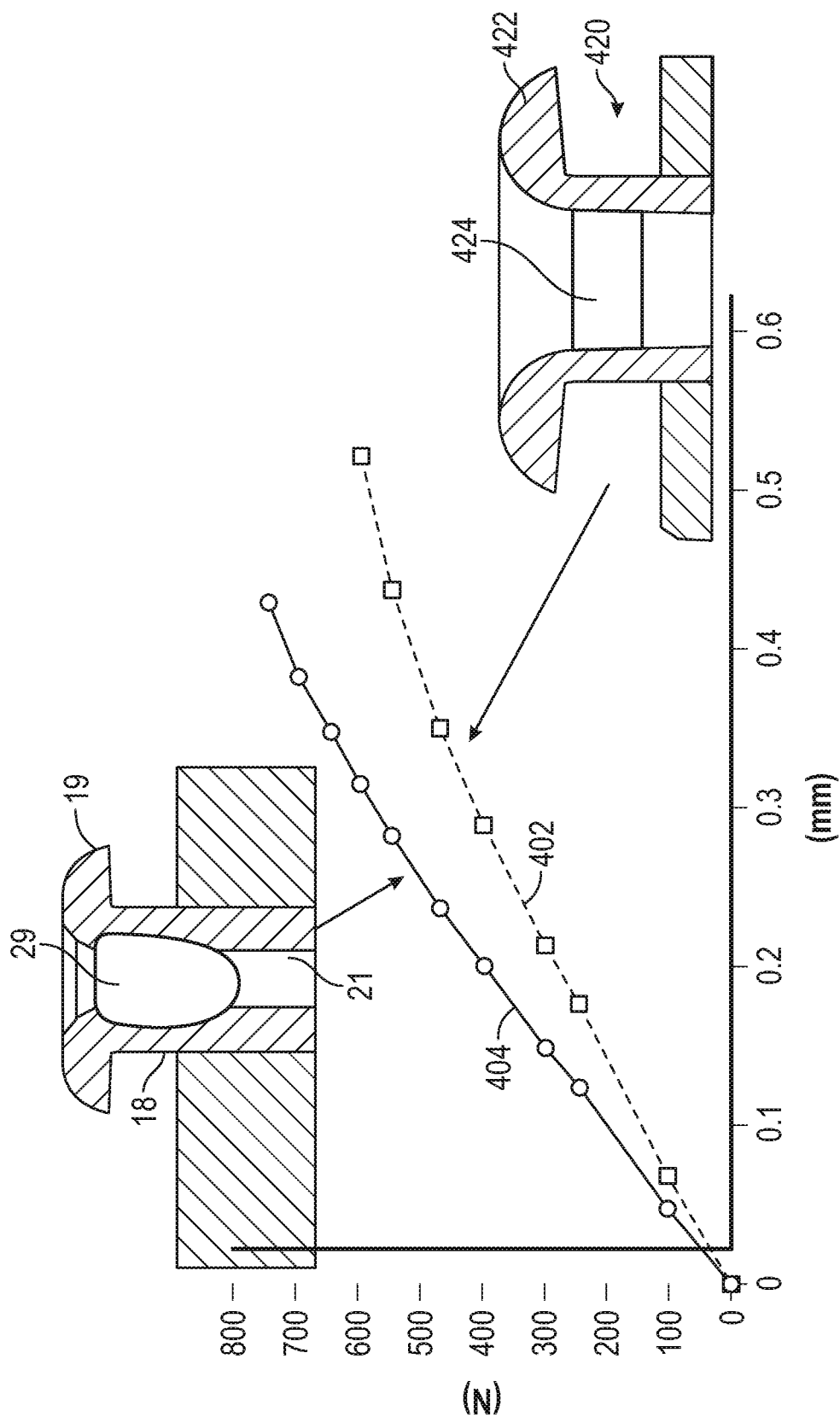
FIG. 4 shows a graph illustrating the increased pull strength of a post formed with the apparatus shown in FIGS. 1A-1D.

In summary, the apparatus 10 and process 100 introduces hot air flow to preheat the polymer of the post 18 and the horn 14 to reduce the stiffness of the polymer and increase the flow of the polymer during the ultrasonic frictional heating of the polymer. Note that with the hybrid ultrasonic staking apparatus 10 and process 100, a portion of the polymer flows into the interior region 21 of the post 18 thereby forming a plug of material 29, as illustrated in FIG. 4. Whereas in conventional ultrasonic staking processes that form, for example, a head 422 of a post 420, little or no polymeric material flows in the interior region 424 of the post 420. As such, as shown in the graph of pull strength (N) as a function of displacement (mm). As an example, the pull strength 404 of the post 18 with the head 19 formed in accordance with the principles of the present disclosure is about 25% greater than the pull strength 402 of the post 420 with the head 422 formed by conventional processes for displacements between about 0.45 mm and 0.55 mm. Accordingly, FIG. 4 clearly illustrates that the flow of material 29 into the interior region 21 of the post 18 provides an increase in pull strength of the post 18 with the head 19. Further, cooling of the polymer at a selected rate as a force is being applied to the head 19 of the post 18 ensures a desired degree of polymer crystallization to further enhance the tensile strength of the post 18 and the head 18 when the two panels 20 and 22 are claimed together.

An apparatus 10 and a process 100 utilizing the hybrid ultrasonic staking of the present disclosure offers one or more advantages. These include the ability to preheat the polymer to reduce the stiffness of the polymer. The preheating of the polymer along with the frictional heating by the ultrasonic vibrations of the polymer increases the tensile strength of the polymer and the cooling of the polymer enables the retainment of the tensile strength.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An apparatus to join two panels together, the apparatus comprising:
   a chamber;
   a spacer positioned between the two panels so that the two panels are separated;
   a horn positioned within the chamber, the horn moving reciprocally within the chamber, the horn having an end with a cavity; and
   a set of heating elements positioned about the horn to heat the horn, wherein one of the panels has a post molded to it, the post extending through the two panels and the spacer, and wherein after the horn is heated the end of the horn is placed on top of the post and is ultrasonically vibrated to form a head of the post with the same shape as the cavity at the end of the horn to join the two panels together.

2. The apparatus of claim 1, wherein the post is made of a material, a portion of the material flowing into the interior of the post to provide increased pull strength of the post.

3. The apparatus of claim 1, wherein a vacuum is drawn in the chamber prior to and during the ultrasonic vibration of the horn.

4. The apparatus of claim 3, wherein the vacuum draw is stopped.

5. The apparatus of claim 3, wherein the vacuum draw removes oxygen to avoid thermal oxidation of the material.

6. The apparatus of claim 1, wherein the horn applies a force to the head of the post after the ultrasonic vibration ceases.

7. The apparatus of claim 6, wherein a flow of cooling air is applied to the horn as the horn applies a force to the head of the post, the cooling temperature having a temperature less than an interior temperature of the chamber.

8. The apparatus of claim 7, wherein the flow of cooling air ceases and the horn moves up away from the head of the post.

9. The apparatus of claim 7, wherein the post is made of a polymer and the cooling of the polymer increases the crystallinity of the polymer.

10. An apparatus to join two panels together, the apparatus comprising:

a chamber;

a spacer positioned between the two panels so that the two panels are separated;

a horn positioned within the chamber, the horn moving reciprocally within the chamber, the horn having an end with a cavity; and a set of heating elements positioned about the horn to heat the horn, wherein one of the panels has a post molded to it, the post extending through the two panels and the spacer, the post being made of a material, a portion of the material flowing into the interior of the post to provide increased pull strength of the post, wherein after the horn is heated the end of the horn is placed on top of the post and is ultrasonically vibrated to form a head of the post with the same shape as the cavity at the end of the horn to join the two panels together, and wherein a vacuum is drawn in the chamber prior to and during the ultrasonic vibration of the horn.

11. The apparatus of claim 10, wherein the vacuum draw ceases.

12. The apparatus of claim 10, wherein the horn applies a force to the head of the post after the ultrasonic vibration ceases.

13. The apparatus of claim 12, wherein a flow of cooling air is applied to the horn as the horn applies a force to the head of the post, the cooling air having a temperature less than an interior temperature of the chamber.

14. The apparatus of claim 13, wherein the flow of cooling air ceases and the horn moves up away from the head of the post.

15. The apparatus of claim 1, wherein the spacer is molded to one of the two panels.

16. The apparatus of claim 10, wherein the spacer is molded to one of the two panels.

17. An apparatus to join two panels together, the apparatus comprising:

a chamber;

a spacer positioned between the two panels so that the two panels are separated;

a horn positioned within the chamber, the horn moving reciprocally within the chamber, the horn having an end with a cavity;

a set of heating elements positioned about the horn to heat the horn; and a post that is configured to extend through the two panels and the spacer, the post being molded to one of the two panels, the post being made of a material that flows into an interior of the post to provide increased pull strength of the post, wherein after the horn is heated the end of the horn is placed on top of the post and is ultrasonically vibrated to form a head of the post with the same shape as the cavity at the end of the horn to join the two panels together, and wherein a vacuum is drawn in the chamber prior to and during the ultrasonic vibration of the horn.

18. The apparatus of claim 17, wherein the spacer is molded to one of the two panels.

19. The apparatus of claim 17, wherein the horn applies a force to the head of the post after the ultrasonic vibration ceases.

20. The apparatus of claim 19, wherein a flow of cooling air is applied to the horn as the horn applies a force to the head of the post, the cooling air having a temperature less than an interior temperature of the chamber.

* * * * *